US007425264B2

(12) United States Patent
Reig

(10) Patent No.: US 7,425,264 B2
(45) Date of Patent: Sep. 16, 2008

(54) CENTRIFUGAL SCREEN

(75) Inventor: Raphael Reig, Poitiers (FR)

(73) Assignee: Weatherford/Lamb, Inc., Houston, TX (US)

( * ) Notice: Subject to any disclaimer, the term of this patent is extended or adjusted under 35 U.S.C. 154(b) by 247 days.

(21) Appl. No.: 11/183,643

(22) Filed: Jul. 18, 2005

(65) Prior Publication Data

US 2006/0021931 A1 Feb. 2, 2006

(30) Foreign Application Priority Data

Jul. 27, 2004 (FR) .................................. 04 51664

(51) Int. Cl.
*B01D 33/06* (2006.01)
*B04B 7/18* (2006.01)

(52) U.S. Cl. .................................... 210/232; 210/360.1

(58) Field of Classification Search ................. 210/232, 210/360.1, 360.2, 497.01, 380.1; 494/36
See application file for complete search history.

(56) References Cited

U.S. PATENT DOCUMENTS 1,495,837 A * 5/1924 Garske ....................... 220/625
3,269,028 A 8/1966 Strich
3,980,563 A * 9/1976 Greutert et al. ............. 210/232
4,158,573 A * 6/1979 Hentschel et al. ............. 127/19
4,193,874 A 3/1980 Gerteis
4,372,856 A * 2/1983 Morrison .................... 210/603
4,443,897 A * 4/1984 Austin ........................... 4/291
5,330,637 A * 7/1994 Nemedi ...................... 210/232
6,579,458 B2 * 6/2003 Mickelat et al. .......... 210/360.1
6,761,821 B2 * 7/2004 Appel et al. ................ 210/232
6,767,821 B1 * 7/2004 Yang et al. .................. 438/619

FOREIGN PATENT DOCUMENTS

EP 1621252 * 2/2006
FR 2 365 374 4/1978

OTHER PUBLICATIONS

French Preliminary Search Report from FR Application No. 0451664 dated Feb. 25, 2005.

* cited by examiner

*Primary Examiner*—Fred Prince
(74) *Attorney, Agent, or Firm*—Patterson & Sheridan, LLP

(57) ABSTRACT

The centrifuge has truncated-cone-like separating screen arranged in support basket and held in the bottom thereof by lower flange. Lower flange has notched surface which penetrates into screen. The screen and the basket both have an annular upper edge and an upper flange which is attached to the upper edge of the basket and covers the upper edge of the screen. Finally, the screen is formed by a number of segments attached in pairs by a joint with a T-shaped section.

11 Claims, 3 Drawing Sheets

CENTRIFUGAL SCREEN

CROSS-REFERENCE TO RELATED APPLICATIONS

This application claims priority to French Patent Application Serial No. FR 04 51664, filed on Jul. 27, 2004, which application is herein incorporated by reference in its entirety.

BACKGROUND OF THE INVENTION

1. Field of the Invention

The present invention concerns a centrifuge which has a truncated-cone-like separating screen arranged in a support basket and held in the bottom thereof by a lower flange.

2. Description of the Related Art

A centrifuge of the type indicated above is known through EP 1400284. It is used as an apparatus for filtering by centrifugation in order to separate a solid from a liquid and, more particularly, in order to separate sugar crystals from syrup in a conventional sugar refining process. The truncated-cone-like separating screen or strainer covers the truncated-cone-like interior wall of the support basket.

The screen is made up of a number of essentially trapezoidal segments which are assembled by welding. The welding of these segments requires much time and frequent checking of the weld points of the screen during use of the centrifuge. Furthermore, the materials used for executing the welds can be detrimental to the quality of filtered products for food use. Additionally, assembly of the screen segments by welding precludes replacement of an individual segment of the screen.

Furthermore, maintaining the separating screen in the basket requires the presence of a stop in the form of an annular bar welded on the interior periphery of the screen supporting the lower flange which presses the screen against the basket, which is expensive to implement.

SUMMARY OF THE INVENTION

The present invention aims to propose a centrifuge which does not have these problems.

Thus, the invention relates to a centrifuge which has a separating screen arranged in a support basket and held in the bottom thereof by a lower flange. Said lower flange has a notched surface which penetrates into the screen. With this arrangement, welding operations are avoided, and the reliability of the attachment of the screen in the basket is increased in a simple manner.

According to a preferred embodiment of the centrifuge according to the invention, the screen and the basket both have an annular upper edge, and moreover, an upper flange is attached to the upper edge of the basket and covers the upper edge of the screen. A separating screen is typically held in the support basket by a single means of attachment at the lower end of the screen. The upper edge of the screen has proven to deteriorate rapidly due to the great stresses exerted by the tangential speed at the periphery of the screen and by the product to be filtered which has a high viscosity at this end. The upper flange makes it possible to keep the screen well pressed against the basket, to prevent deterioration of the screen at the upper edge, and serves as stop for the screen in order to prevent its ejection.

According to another preferred embodiment of the centrifuge according to the invention, the screen is a truncated cone and is formed by a number of segments attached in pairs by a joint with a T-shaped section. The joint with the T-shaped section can be removably attached to the basket by screws so as to avoid any welding operations for mounting the screen in the basket. Furthermore, each worn segment of the screen can be replaced independently of the other segments by rapid removal of the joint.

Preferably, the notched surface of the lower flange is comprised of notches that can receive a surface treatment, for example, case hardening, for the purpose of hardening them in order to reduce the effects of wear and tear over time.

BRIEF DESCRIPTION OF THE DRAWINGS

The invention will be better understood upon reading the following description and upon examination of the accompanying figures. This description is only given as an indicative example and in no way limits the invention.

DETAILED DESCRIPTION OF THE PREFERRED EMBODIMENT

Figure 2:
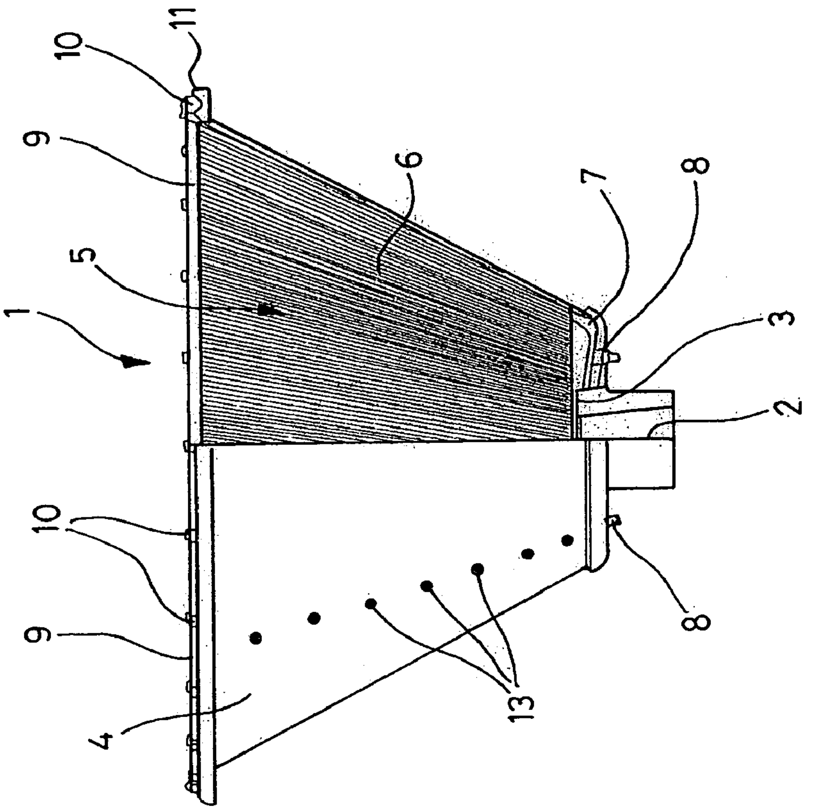
FIG. 2, to the right, shows a section passing through its axis, and to the left, shows a front view of the drum shown in FIG. 1.
Figure 1:
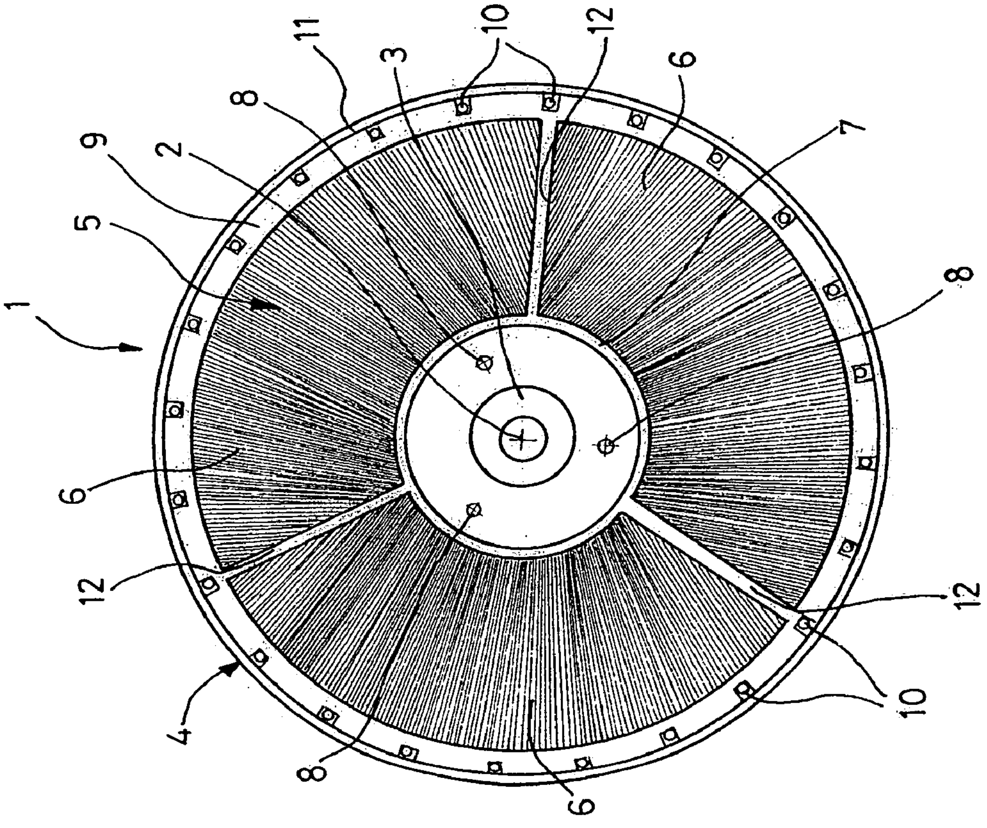
FIG. 1 is a top view of a drum of a centrifuge according to the invention which has a truncated-cone-like screen and a support basket.

Represented in FIGS. 1 and 2 is drum 1 of a centrifuge according to the invention, which is a truncated cone with axis 2. Bottom 3 of the drum is made up of the smaller section of the truncated cone. Drum 1 is rotated about its axis 2 during operation of the centrifuge, where bottom 3 is shown oriented downwards in FIG. 2 but can be oriented differently depending on the centrifuge. Drum 1 is composed of a truncated-cone-like support basket 4 which can be seen in FIG. 2, and of truncated-cone-like separating screen 5, separating screen 5 being arranged inside support basket 4. Support basket 4 is a metallic mesh or a rigid perforated metal sheet with openings allowing the flow of the filtrates. Separating screen 5 in the embodiment presented in FIG. 1 is composed of three essentially trapezoidal screen segments 6 attached in a removable manner to support basket 4. More particularly, segments 6 are attached at their lower edge by means of lower securing flange 7 which is annular about axis 2, and which is attached to basket 4, for example, by means of bolts 8 as described further below.

Furthermore, segments 6 are attached at their upper edge by means of upper securing flange 9 which is annular about axis 2. Upper flange 9 is fixed to and screwed onto the annular upper edge of basket 4, for example, by means of bolts 10, the upper edge of the basket having peripheral horizontal extension 11 (more clearly seen in FIG. 5), arranged for receiving bolts 10 as described further below.

Finally, the lateral edge of segment 6, which is adjacent to a lateral edge of another segment 6, is tightened over its whole length against support basket 4 by joint 12 in the form of a rod with a T-shaped section. This joint 12 is screwed to support basket 4 by means of screws 13, as can be seen in FIG. 2. The attachment by means of joint 12 will be described in more detail further below.

Figure 3:
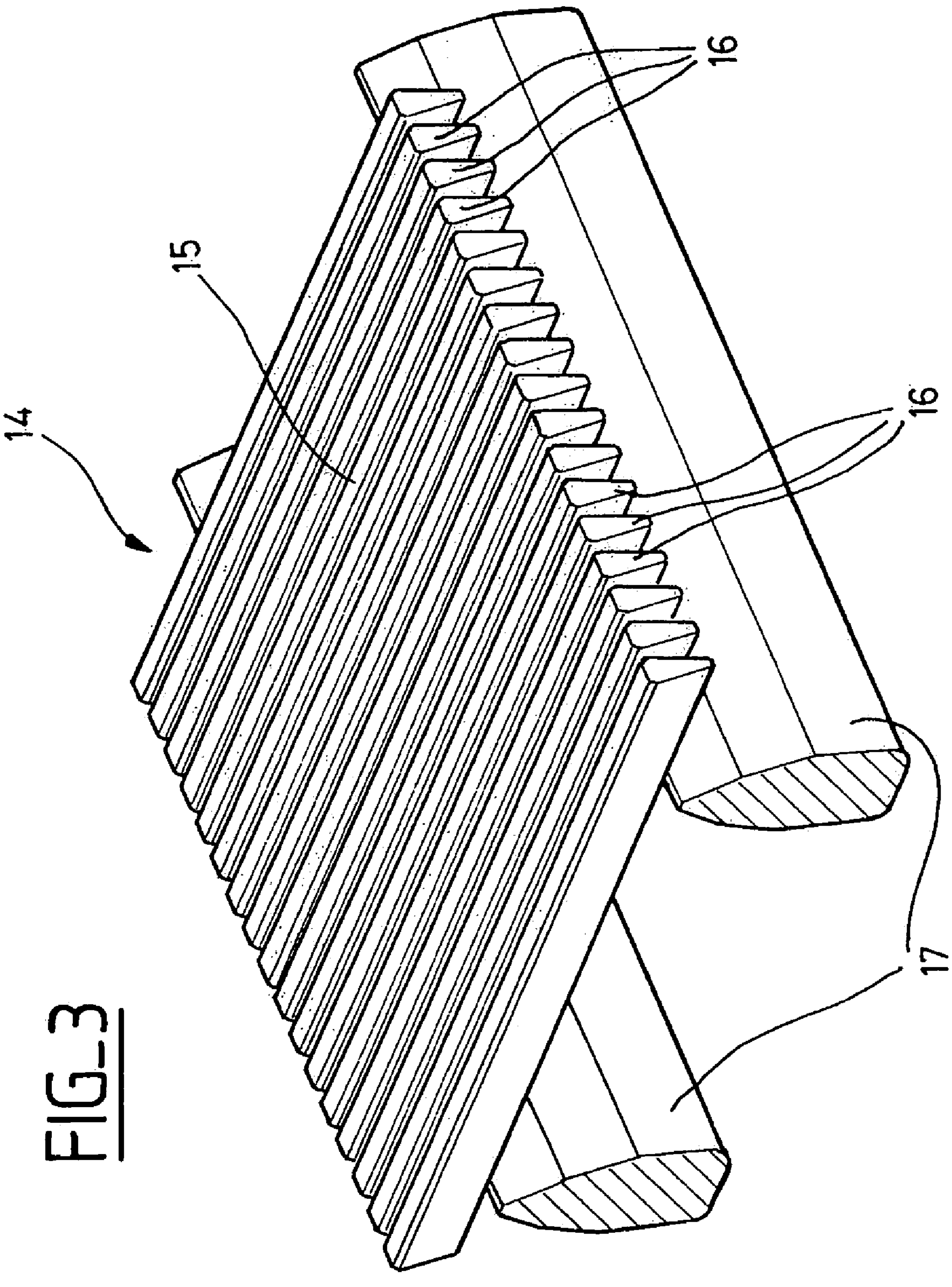
FIG. 3 is a perspective view of a screen portion of the drum shown in FIG. 1.

Separating screen 5 can be of the same type as that described in the EP 1400284, that is, as the "V-wire" type of the company "Johnson screens." In this type of screen 5, a portion 14 of which is represented in FIG. 3, upper filtering surface 15 is formed by straight wires 16 with a V-shaped section, which are parallel at constant intervals, the space between wires 16 giving the caliber of the screen. These wires 16 are welded to support rods 17 oriented essentially perpendicularly with respect to wires 16, and are very thin in order to maximize the effective filtering surface area. Such a screen 5 has the advantage of being very strong, of not becoming clogged and of being backwashable because of the V-shaped wires 16, and of optimizing the effective surface area because wires 16 do not rest directly against basket 4.

Figure 4:
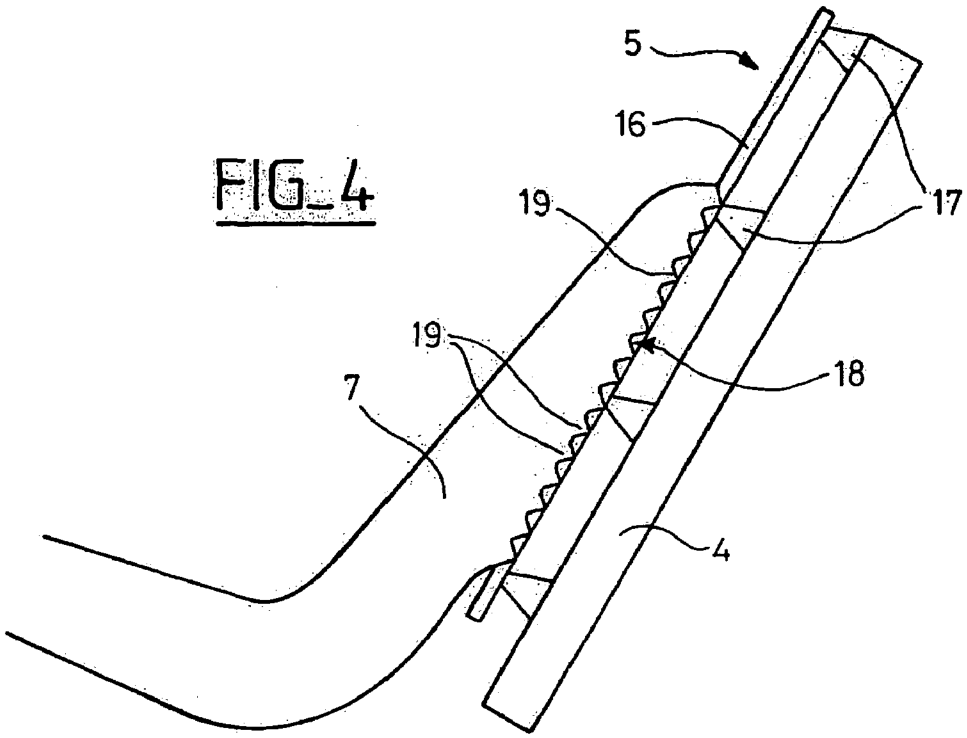
FIG. 4 shows a section view of a lower clamping flange of the screen on the basket of the centrifuge according to the invention.

Represented in the section of FIG. 4 is the fixing of screen 5 to basket 4 by means of lower flange 7, this fixing occurring over the entire circumference of the interior edge of screen 5. Lower flange 7 essentially has the shape of a seat with a central part in the form of a flat disk bordered by a truncated cone. The bottom of the seat is fixed to bottom 3 of basket 4 by bolts 8. Lower flange 7 has essentially a truncated conical exterior annular surface 18 which is notched, with very pointed notches (serrations) 19. When lower flange 7 is bolted to bottom 3 of basket 4, notched exterior annular surface 18 of lower flange 7 rests against screen 5, presses screen 5 against basket 4, and notches 19 of notched surface 18 penetrate into the material of V-shaped wires 16 of the screen. In this way, screen 5 is firmly gripped and cannot slide and be ejected from basket 4.

Notched surface 18 is hardened by a surface treatment, for example, case hardening, so that notches 19 are very hard and do not become worn.

It is possible for notches 19 to be arranged only on certain parts of the circumference of screen 5. Notches 19 of the lower flange can be formed by milling.

Figure 5:
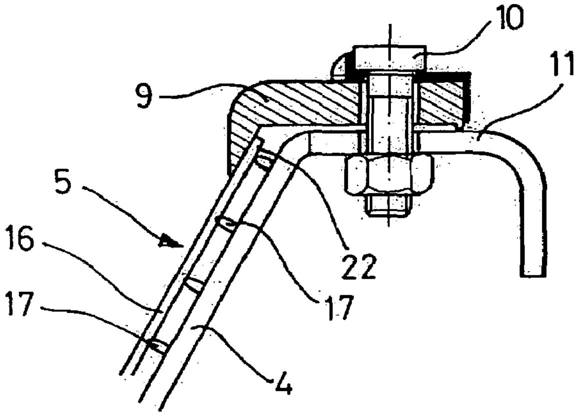
FIG. 5 shows a sectional view of an upper clamping flange of the screen on the basket of the centrifuge according to the invention.

FIG. 5 shows a sectional representation of upper securing flange 9, upper flange 9 which presses screen 5; screen 5 has annular upper edge 22, against basket 4 over the entire circumference of annular upper edge 22 of screen 5. This upper securing flange 9 is firmly fixed under peripheral horizontal extension 11 of the upper edge of basket 4 by means of bolts 10, and covers upper edge 22 of the screen over a few millimeters in order to protect it. Upper flange 9 is present as a circular flat ring whose interior edge is curved. More particularly, upper flange 9 has the shape of a hollow flat ring with a truncated-cone-like extension starting from the interior end of the ring. The ring rests on horizontal extension 11 of the upper edge of basket 4, and bolts 10 pass through the ring and horizontal extension 11. The truncated-cone-like extension of the upper flange rests against upper edge 22 of the screen.

The shape of upper flange 9 facilitates the ejection of the non-filtered product from drum 1. Upper flange 9 can also be formed by a number of separate tabs which only press against certain parts of the circumference of screen 5.

Figure 6:
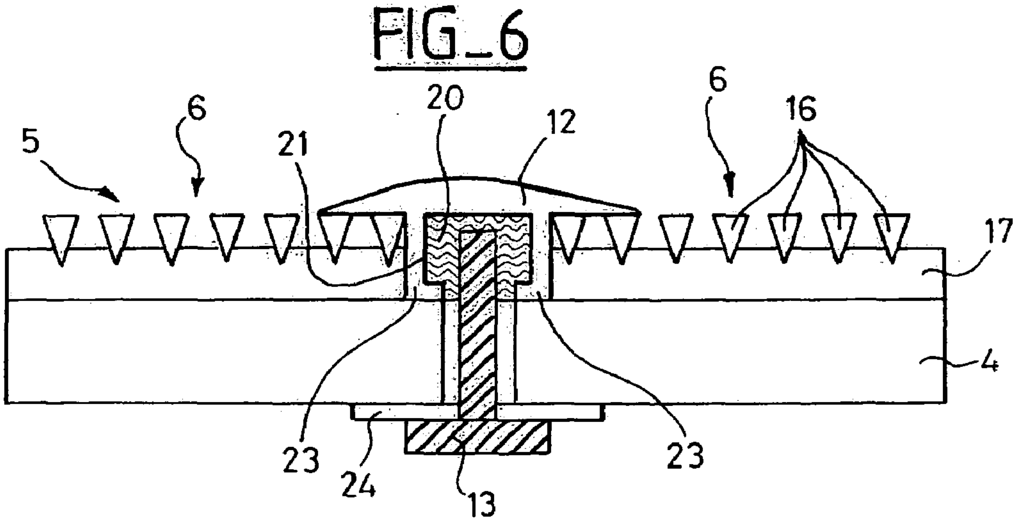
FIG. 6 shows a sectional view of a T-shaped joint fixing two screen segments on the basket of the centrifuge according to the invention.

Represented in the section of FIG. 6 is joint 12 in the form of a rod with a T-shaped section. Each side of the horizontal branch of the T covers a few millimeters of the edge of segment 6 of screen 5, the vertical branch of the T being inserted between the edges of adjacent segments 6 and extending in the direction of basket 4. The edges of two segments 6 are attached in a removable manner and tightened against basket 4 with screws 13 which pass through openings of the mesh constituting basket 4 and are screwed into nuts 20, each having a threaded hole and arranged in a sliding manner in slide 21 or a recess formed in the vertical branch of the T over the entire length of joint 12. Nuts 20 are movable in joint 12 and can be placed facing an opening of basket 4. During securing, nuts 20 stop against shoulders 23 of slide 21 of joint 12 and press joint 12 and screen 5 against basket 4.

The heads of screws 13 stop against washers 24 so as to stabilize the attachment and to prevent any deformation of basket 4. The horizontal bar of the T is slightly rounded (domed) so as not to create disturbances in drum 1 during centrifugation.

In another embodiment of the invention which is not represented, screws, the heads of which slide in slide 21 of joint 12, make it possible to press joint 12 and screen 5 against basket 4 in combination with nuts arranged on the exterior surface of basket 4.

As can be seen, the screen is attached in the basket in a removable manner without welding, which simplifies the mounting of the screen, allows segments to be replaced individually, and improves the quality of filtered products for use as food.

I claim:

1. A centrifuge comprising: a separating screen arranged in a support basket and held in a bottom thereof by a lower flange, wherein the lower flange has a notched surface which penetrates into the screen.

2. The centrifuge according to claim 1, wherein the screen and the basket both have an annular upper edge whereby an upper flange operatively fixed to the upper edge of the basket covers the upper edge of the screen.

3. The centrifuge according to claim 1, wherein the screen is a truncated cone and is formed by a number of segments attached in pairs by a joint with a T-shaped section.

4. The centrifuge according to claim 3, wherein the joint with the T-shaped section has a vertical branch which is removably attached to the basket.

5. The centrifuge according to claim 4, wherein the joint with the T-shaped section is attached to the basket by at least one connection member.

6. A Process for manufacturing of a centrifuge according to claim 1, in which notched surface has notches which are hardened by case hardening.

7. The centrifuge according to claim 1, wherein the separating screen comprises at least two sections connected by a joint member.

8. The centrifuge according to claim 7, wherein the joint member is a T-shaped joint member.

9. The centrifuge according to claim 7, wherein the joint member is attached to the basket by a releasable connection.

10. The centrifuge according to claim 9, wherein the joint member is a T-shaped joint member.

11. The centrifuge according to claim 7, wherein the joint member comprises a releasable connector.

* * * * *